US012570450B2

(12) United States Patent
Spitler

(10) Patent No.: US 12,570,450 B2
(45) Date of Patent: Mar. 10, 2026

(54) CARRIER FOR CONTAINERS

(71) Applicant: Graphic Packaging International, LLC, Atlanta, GA (US)

(72) Inventor: Donald Spitler, Buford, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 18/228,165

(22) Filed: Jul. 31, 2023

(65) Prior Publication Data

US 2024/0034531 A1 Feb. 1, 2024

Related U.S. Application Data

(60) Provisional application No. 63/394,034, filed on Aug. 1, 2022.

(51) Int. Cl.
*B65D 71/58* (2006.01)
*B31B 50/26* (2017.01)
(Continued)

(52) U.S. Cl.
CPC ........ *B65D 71/0022* (2013.01); *B31B 50/262* (2017.08); *B31B 50/732* (2017.08);
(Continued)

(58) Field of Classification Search
CPC ... B31B 50/262; B31B 50/624; B31B 50/732; B31B 2100/0024; B31B 2110/35;
(Continued)

(56) References Cited

U.S. PATENT DOCUMENTS 1,968,877 A 8/1934 Cubberley
2,225,822 A 12/1940 Crook
(Continued)

FOREIGN PATENT DOCUMENTS

AR 78777 12/2008
CA 2 216 515 8/1997
(Continued)

OTHER PUBLICATIONS

International Search Report and Written Opinion for PCT/US2023/029070 dated Nov. 21, 2023.

*Primary Examiner* — Bryon P Gehman
(74) *Attorney, Agent, or Firm* — Andrew N. Claerbout; FisherBroyles, LLP

(57) ABSTRACT

A carrier for holding one or more articles. The carrier can comprise a plurality of panels extending at least partially around an interior of the carrier and a bottom wall extending along the interior of the carrier. The bottom wall can comprise a first locking member and a second locking member, wherein the first locking member and the second locking member engage one another to form the bottom wall. The first locking member can comprise a first bottom panel and a first bottom flap in an at least partially overlapping relationship, and the second locking member can comprise a second bottom panel and a second bottom flap in an at least partially overlapping relationship. The carrier further can comprise a central wall foldably connected to one or more panels of the plurality of panels.

43 Claims, 7 Drawing Sheets

(51) Int. Cl.
*B31B 50/62* (2017.01)
*B31B 50/73* (2017.01)
*B31B 100/00* (2017.01)
*B31B 110/35* (2017.01)

(52) U.S. Cl.
CPC ..... *B31B 50/624* (2017.08); *B31B 2100/0024* (2017.08); *B31B 2110/35* (2017.08)

(58) Field of Classification Search
CPC . B31B 50/14; B31B 50/747; B31B 2100/002; B65D 71/00; B65D 71/0022; B65D 75/00; B65D 71/58
USPC ......................... 206/162, 174, 175, 178, 180
See application file for complete search history.

(56) References Cited

U.S. PATENT DOCUMENTS 2,227,330 A 12/1940 Turner
2,296,937 A 9/1942 Lyons, Jr.
2,324,771 A 7/1943 Fiore
2,331,312 A 10/1943 Dorfman
2,336,857 A 12/1943 Gies et al.
2,345,567 A 4/1944 Arneson
2,371,471 A 3/1945 Rothstein
2,384,480 A 9/1945 Lupton
2,389,318 A 11/1945 Lebold
2,417,421 A 3/1947 Koolnis
2,446,161 A 7/1948 Price
2,522,950 A 9/1950 Keith
2,558,618 A 6/1951 Lebold
2,563,065 A 8/1951 Price
2,606,711 A 8/1952 Forrer
2,653,749 A 9/1953 Milchin
2,689,061 A 9/1954 Gray
2,783,916 A 3/1957 Hodapp
2,794,571 A 6/1957 Fielding
2,804,234 A 8/1957 Lachance
2,808,177 A 10/1957 Buttery
2,860,771 A 11/1958 Spiegel, Jr.
2,950,854 A 8/1960 Ganz
3,053,411 A 9/1962 Struble et al.
3,190,487 A 6/1965 Wood
3,191,800 A 6/1965 Kowal
3,229,849 A 1/1966 Spillson
3,236,414 A 2/1966 Slevin, Jr.
3,355,012 A 11/1967 Weiss
3,386,570 A 6/1968 Lock
3,394,800 A 7/1968 Brackett
3,669,306 A 6/1972 Forrer
3,670,950 A 6/1972 Rossi
3,744,704 A 7/1973 Struble
3,820,657 A 6/1974 Klygis et al.
3,884,353 A 5/1975 Forte
3,917,061 A 11/1975 Stout
4,101,069 A 7/1978 Wood
4,146,168 A 3/1979 Hartline
4,155,502 A 5/1979 Forte
4,171,046 A 10/1979 Bonczyk
4,205,748 A 6/1980 Wilson
4,234,114 A 11/1980 Wood
4,243,138 A 1/1981 Wilson
4,284,195 A 8/1981 Champlin
4,308,950 A 1/1982 Wood
4,326,628 A 4/1982 Wood
4,362,240 A 12/1982 Elward
4,374,561 A 2/1983 Stout et al.
4,413,729 A 11/1983 Wood
4,424,901 A 1/1984 Lanier
4,450,956 A 5/1984 Wood
4,480,746 A 11/1984 Wood
4,509,640 A 4/1985 Joyce
4,533,047 A 8/1985 Calvert
4,601,390 A 7/1986 Rosenthal et al.
4,610,349 A 9/1986 Schwartz et al.
4,708,284 A 11/1987 Sutherland et al.
4,722,437 A 2/1988 Walsh
4,792,038 A 12/1988 Cooper
4,927,009 A 5/1990 Stout
5,040,672 A 8/1991 DeMaio et al.
5,069,335 A 12/1991 Beales
5,161,732 A 11/1992 Clein et al.
5,167,325 A 12/1992 Skora
5,234,103 A 8/1993 Schuster
5,392,984 A 2/1995 Yocum
5,437,363 A 8/1995 Gungner
5,458,234 A 10/1995 Harris
5,484,053 A 1/1996 Harris
5,485,915 A 1/1996 Harris
5,499,712 A 3/1996 Harrelson
5,531,319 A 7/1996 Harrelson
5,538,130 A 7/1996 Harrelson
5,538,131 A * 7/1996 Harrelson .......... B65D 71/0022 206/170
5,549,197 A 8/1996 Sutherland
5,590,762 A 1/1997 Harrelson
5,590,776 A 1/1997 Galbierz
5,593,027 A 1/1997 Sutherland
5,595,291 A 1/1997 Negelen
5,624,024 A 4/1997 Miess
5,645,162 A 7/1997 Harrelson
5,649,620 A 7/1997 Harrelson
5,657,864 A 8/1997 Harrelson
5,657,865 A 8/1997 Harrelson
5,682,982 A 11/1997 Stonehouse
5,695,051 A 12/1997 Hart
5,775,487 A 7/1998 Harrelson
5,775,574 A 7/1998 Whitnell
5,803,264 A 9/1998 Gersten et al.
5,871,090 A 2/1999 Doucette et al.
5,878,877 A 3/1999 Sutherland
5,947,273 A 9/1999 Dalrymple et al.
5,979,747 A 11/1999 Gnadt et al.
6,089,638 A 7/2000 Whitnell
6,131,729 A 10/2000 Eckermann et al.
6,155,962 A 12/2000 Dalrymple et al.
6,230,882 B1 5/2001 Wischusen, III
6,315,111 B1 11/2001 Sutherland
6,341,689 B1 1/2002 Jones
6,371,287 B1 4/2002 Jones et al.
6,443,308 B1 * 9/2002 Davis ................. B65D 71/0022 206/194
6,598,739 B1 7/2003 Collura
6,695,137 B2 2/2004 Jones et al.
6,736,260 B2 5/2004 Gomes et al.
6,832,687 B2 * 12/2004 Davis ................. B65D 21/0238 206/549
6,866,187 B2 3/2005 Reagan
6,896,130 B2 5/2005 Theelen
6,938,756 B2 9/2005 Schuster
7,011,209 B2 3/2006 Sutherland et al.
7,134,547 B2 11/2006 Auclair
D538,644 S 3/2007 DeVine
7,185,758 B2 3/2007 Cuomo
7,243,785 B2 7/2007 Cuomo
7,267,224 B2 9/2007 Cuomo
7,357,247 B2 4/2008 Guenther
7,370,755 B2 5/2008 Cuomo
7,374,038 B2 5/2008 Smalley
7,578,385 B2 8/2009 Holley, Jr.
7,604,115 B2 10/2009 Cuomo
7,677,387 B2 3/2010 Brand et al.
8,091,702 B1 1/2012 Keip
8,297,437 B2 10/2012 Smalley et al.
8,424,677 B2 4/2013 Spivey, Sr. et al.
D698,267 S 1/2014 Wagner
8,622,207 B2 1/2014 Smalley
D729,073 S 5/2015 Wasilewski
10,287,073 B2 5/2019 Zammit et al.
10,518,951 B2 12/2019 Holley, Jr.
D872,597 S 1/2020 Holley, Jr.
10,543,969 B2 1/2020 Gonzalez et al.
D875,550 S 2/2020 Hong
D878,931 S 3/2020 Boersma

(56) References Cited

U.S. PATENT DOCUMENTS

| | | | |
|---|---|---|---|
| D878,932 | S | 3/2020 | Holley, Jr. |
| D883,803 | S | 5/2020 | Smalley |
| D886,640 | S | 6/2020 | Boersma |
| 10,766,680 | B2 | 9/2020 | Holley, Jr. |
| 10,858,145 | B2 | 12/2020 | Spivey, Sr. et al. |
| D944,655 | S | 3/2022 | Rattanapaibooncharoen |
| D972,942 | S | 12/2022 | Holley, Jr. |
| 11,548,708 | B2 | 1/2023 | Holley, Jr. |
| 11,697,537 | B2 | 7/2023 | Holley, Jr. |
| 2002/0020653 | A1 | 2/2002 | Davis |
| 2002/0185387 | A1 | 12/2002 | Davis |
| 2003/0111363 | A1 | 6/2003 | Theelen |
| 2003/0159950 | A1 | 8/2003 | Jones et al. |
| 2003/0213705 | A1 | 11/2003 | Woog |
| 2004/0094435 | A1 | 5/2004 | Auclair et al. |
| 2005/0103651 | A1 | 5/2005 | Lebras |
| 2005/0230273 | A1 | 10/2005 | Kohler |
| 2007/0029212 | A1 | 2/2007 | Smalley |
| 2009/0008273 | A1 | 1/2009 | Smalley |
| 2010/0252456 | A1 | 10/2010 | Cook et al. |
| 2016/0236840 | A1 | 8/2016 | Schindler |
| 2017/0144814 | A1 | 5/2017 | Schindler |
| 2017/0152091 | A1 | 6/2017 | Holley, Jr. |
| 2021/0371178 | A1 | 12/2021 | Gungner |

FOREIGN PATENT DOCUMENTS

| | | | |
|---|---|---|---|
| CN | 101484368 | A | 7/2009 |
| DE | 9004439 | | 6/1990 |
| EP | 0 452 563 | | 10/1991 |
| EP | 1 319 607 | | 6/2003 |
| EP | 1 348 638 | | 10/2003 |
| FR | 1 447 208 | | 7/1966 |
| GB | 2 279 065 | | 12/1994 |
| GB | 6113287 | | 1/2021 |
| JP | 2010-047303 | A | 3/2010 |
| KR | 101656733 | B1 | 9/2016 |
| WO | WO 97/05026 | | 2/1997 |
| WO | WO 98/19932 | | 5/1998 |
| WO | WO 2005/044687 | | 5/2005 |
| WO | WO 2010/036778 | A1 | 4/2010 |
| WO | WO 2017/091375 | A1 | 6/2017 |

* cited by examiner

CARRIER FOR CONTAINERS

CROSS-REFERENCED TO RELATED APPLICATIONS

This application claims the benefit of U.S. Provisional Patent Application No. 63/394,034, filed on Aug. 1, 2022.

INCORPORATION BY REFERENCE

The disclosure of U.S. Provisional Patent Application No. 63/394,034, which was filed on Aug. 1, 2022, is hereby incorporated by reference for all purposes as if presented herein in its entirety.

BACKGROUND OF THE DISCLOSURE

The present disclosure generally relates to carriers or cartons for holding and displaying containers. More specifically, the present disclosure relates to basket-style carriers.

SUMMARY OF THE DISCLOSURE

In general, one aspect of the disclosure is directed to a carrier for holding one or more articles. The carrier can comprise a plurality of panels extending at least partially around an interior of the carrier and a bottom wall extending along the interior of the carrier. The bottom wall can comprise a first locking member and a second locking member, wherein the first locking member and the second locking member engage one another to form the bottom wall. The first locking member can comprise a first bottom panel and a first bottom flap in an at least partially overlapping relationship, and the second locking member can comprise a second bottom panel and a second bottom flap in an at least partially overlapping relationship. The carrier further can comprise a central wall foldably connected to one or more panels of the plurality of panels.

In another aspect, the disclosure is generally directed to a blank for forming a carrier for holding a plurality of articles. The blank can comprise a plurality of panels for extending at least partially around an interior of the carrier formed from the blank and a first bottom panel, a first bottom flap, a second bottom panel, and a second bottom flap foldably connected to respective panels of the plurality of panels. The first bottom panel and the first bottom flap are for being at least partially overlapped to at least partially form a first locking member when the carrier is formed from the blank, and the second bottom panel and the second bottom flap are for being at least partially overlapped to at least partially form a second locking member when the carrier is formed from the blank. The first locking member and the second locking member can be for engaging one another to form a bottom wall of the carrier formed from the blank. The blank further can comprise a central panel foldably connected to one or more panels of the plurality of panels. The central panel can be for at least partially forming a central wall of the carrier formed from the blank.

In another aspect, the disclosure is generally directed to a method of forming a carrier for holding a plurality of articles. The method can comprise obtaining a blank comprising a plurality of panels, a central panel foldably connected to one or more panels of the plurality of panels, and a first bottom panel, a first bottom flap, a second bottom panel, and a second bottom flap foldably connected to respective panels of the plurality of panels. The method further can comprise folding the plurality of panels to at least partially form a collapsed carrier and forming the carrier by folding the collapsed carrier to move the plurality of panels to extend at least partially around an interior of the carrier. The folding the collapsed carrier can cause the first bottom panel and the first bottom flap to be at least partially overlapped to at least partially form a first locking member, can cause the second bottom panel and the second bottom flap to be at least partially overlapped to at least partially form a second locking member, and can cause the first locking member and the second locking member to engage one another to form a bottom wall of the carrier.

In another aspect, the disclosure is generally directed to carrier for holding one or more articles. The carrier can comprise a plurality of panels comprising at least a front panel, a side panel, and a central panel. The central panel can extend from the side panel to at least partially divide the carrier into a front portion and a back portion. The carrier further can comprise a bottom wall comprising at least a bottom panel foldably connected to the front panel and a bottom flap foldably connected to the side panel. The bottom wall can comprise at least a first locking feature extending in the bottom panel and a second locking feature extending in the bottom flap, wherein the bottom panel and the bottom flap are in an at least partially overlapping relationship so that the first locking feature and the second locking feature are at least partially aligned.

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

Corresponding parts are designated by corresponding reference numbers throughout the drawings.

DETAILED DESCRIPTION OF THE EXEMPLARY EMBODIMENT

The present disclosure generally relates to carriers, packages, constructs, sleeves, cartons, or the like, for holding and displaying articles including containers, such as cups, bottles, jars, cans, etc., and/or other suitable articles, such as food items, cutlery, napkins, etc. The containers can be used for packaging and/or holding beverage and food products, for example. The containers can be made from materials suitable in composition for packaging and/or holding the particular beverage or food item, and the materials include, but are not limited to, plastics such as PET, LDPE, LLDPE, HDPE, PP, PS, PVC, EVOH, and Nylon; paper-based materials such as paperboard; glass; aluminum and/or other metals; and the like; or any combination thereof.

Carriers according to the present disclosure can accommodate articles of numerous different shapes. For the purpose of illustration and not for the purpose of limiting the scope of the disclosure, the following detailed description describes beverage and/or food containers (e.g., cups, bottles, and/or other suitable containers made from paperboard, plastic, glass, metal, and/or other suitable materials) and/or other articles (e.g., food items, cutlery, napkins, and/or other suitable items) at least partially disposed within the carrier embodiments. In this specification, the terms "inner," "interior," "outer," "exterior," "lower," "bottom," "upper," "top," "front," "forward," "back," "rear," and "rearward" indicate orientations determined in relation to fully erected and upright carriers. As described herein, carriers can be formed from blanks by being glued with multiple panels, portions, tabs, and/or flaps, which may be designated herein in terms relative to one another, e.g., "first", "second", "third", etc., in sequential or nonsequential reference, without departing from the disclosure.

Figure 1:
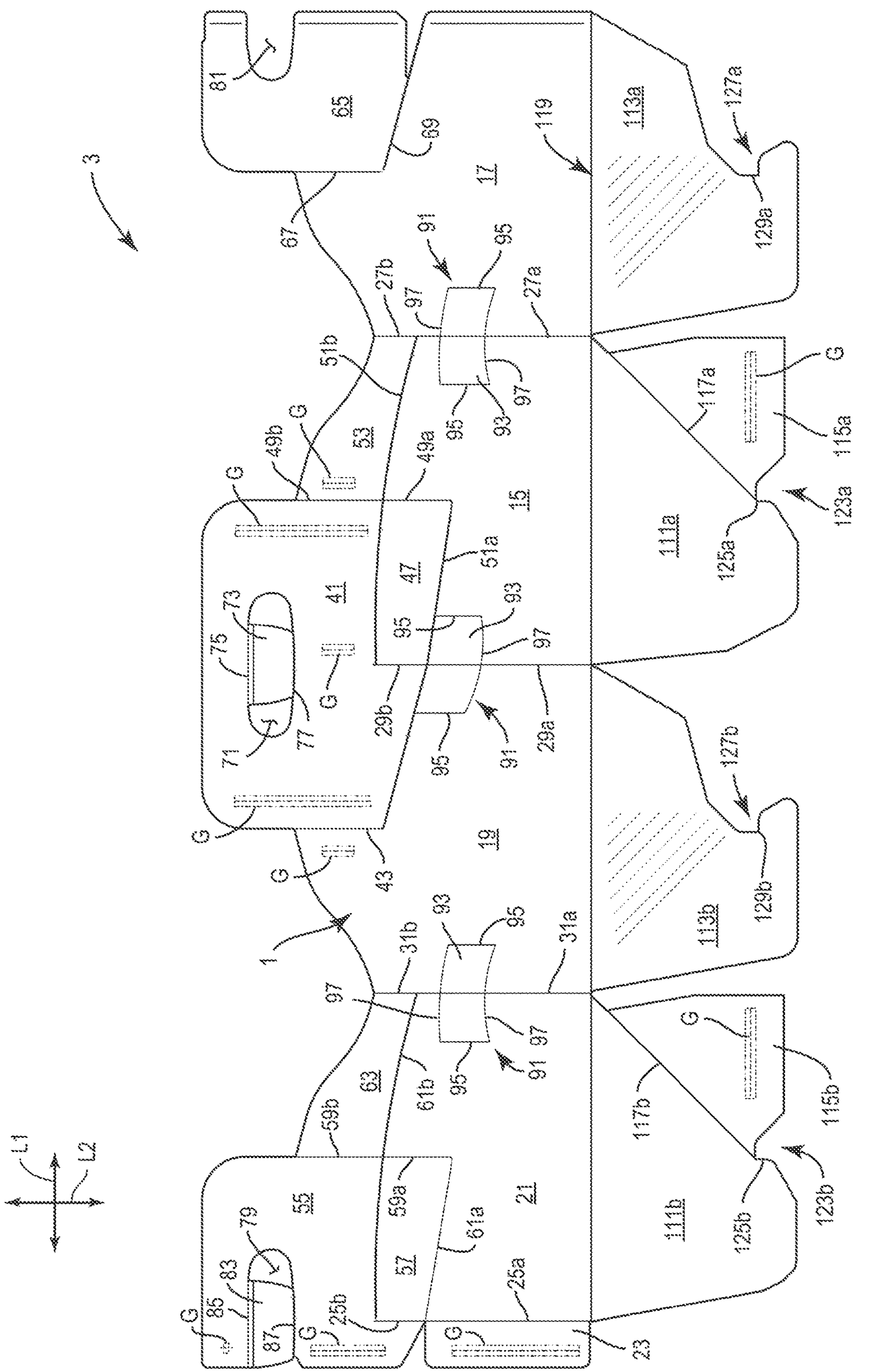
FIG. 1 is an exterior plan view of a blank used to form a carrier according to exemplary embodiments of the disclosure.
Figure 4:
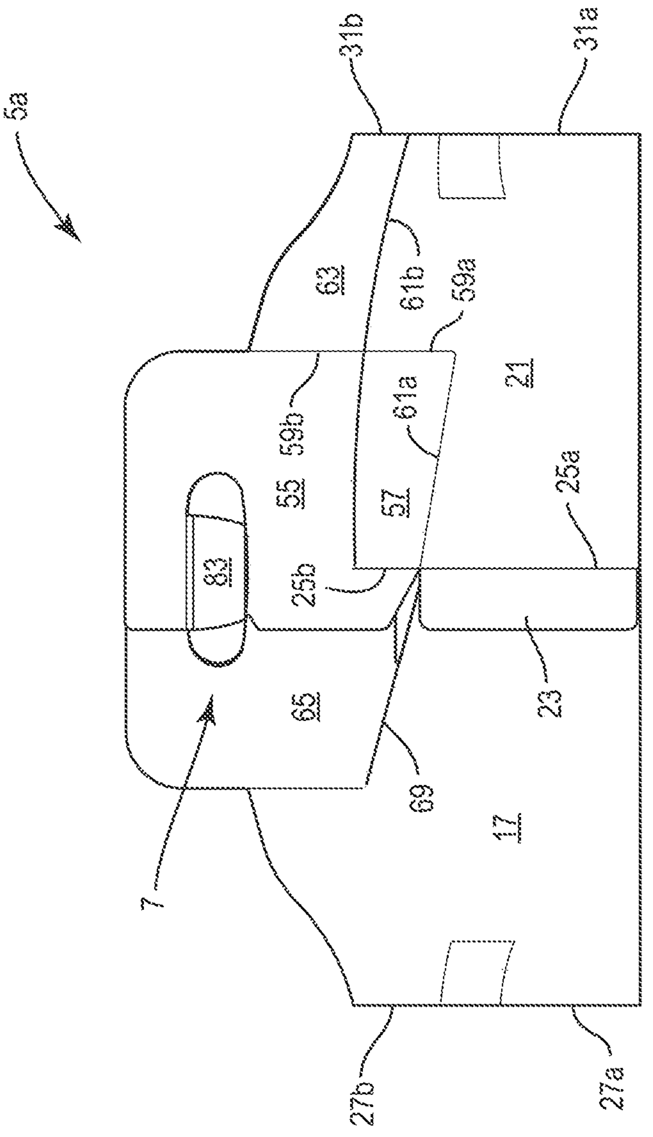
FIG. 4 is a plan view of the construct formed from the blank of FIG. 1 in the form of a flattened carrier according to exemplary embodiments of the disclosure.

FIG. 1 is a plan view of an exterior side 1 of a blank 3 used to form a carrier 5 (e.g., a basket-style carrier) (FIGS. 5-7) for holding a plurality of containers and/or other articles (not shown), in accordance with exemplary embodiments of the present disclosure. In one embodiment, the carrier 5 is sized to contain four containers in respective receiving spaces, two containers being contained in a front portion of the carrier and two containers being contained in a back portion of the carrier. In embodiments, any number of articles could be held in each of the receiving spaces of the carrier. The carrier 5 can be sized and shaped to hold more or fewer than four containers without departing from the disclosure. In the illustrated embodiment, the carrier 5 includes a handle 7 (FIGS. 5 and 6) as described in more detail below. In the illustrated embodiment, the carrier 5 is the erected carrier 5 of FIG. 5 that receives the containers to form a package. As shown in FIG. 4, the carrier 5 can be in a collapsed configuration, which can be referred to as the collapsed carrier 5*a* in one embodiment. In the illustrated embodiment, the carrier 5 includes a bottom wall 10 formed of at least partially overlapped bottom panels and bottom flaps with locking features as described in more detail below.

In the illustrated embodiment, the carrier blank 3 has a longitudinal axis L1 and a lateral or transverse axis L2. The carrier blank 3 includes a front panel 15 foldably connected to a first side panel 17 and a second side panel 19, and a back panel 21 foldably connected to the second side panel 19. An attachment flap 23 is foldably connected to the back panel 21 along a lateral fold line 25*a*. Lateral fold lines 27*a*, 29*a* foldably connect the respective first and second side panels 17, 19 to the front panel 15, and a lateral fold line 31*a* foldably connects the back panel 21 to the second side panel 19.

In embodiments, the carrier blank 3 includes a first or front central panel 41 foldably connected to the second side panel 19 along a lateral fold line 43. As shown in FIG. 1, a first or front divider panel 47 is foldably connected to the front central panel 41 along a lateral fold line 29*b* (which can be collinear with the lateral fold line 29*a*, for example). In the illustrated embodiments, the front divider panel 47 is foldably connected to the front panel 15 along a lateral fold line 49*a* and is at least partially separable from the front panel 15 and the central panel 41 along respective cut or tear lines 51*a*, 51*b* (e.g., cut lines interrupted by one or more nicks). As shown in FIG. 1, the front central panel 41 is connected to the first side panel 17 by a connector panel 53 (e.g., a first connector panel), which is foldably connected to the first side panel 17 along a lateral fold line 27*b* (which can be collinear with the lateral fold line 27*a*, for example) and is foldably connected to the front central panel 41 along a lateral fold line 49*b* (which can be collinear with the lateral fold line 49*a*, for example). In embodiments, the connector panel 53 can be at least partially separable from the front panel 15 along the cut or tear line 51*b*.

As shown in FIG. 1, the carrier blank 3 includes a second or back central panel 55 and a second or back divider panel 57. In the illustrated embodiments, the back divider panel 57 is foldably connected to the back central panel 55 along a lateral fold line 25*b* (which can be collinear with the lateral fold line 25*a*, for example) and is foldably connected to the back panel 21 along a lateral fold line 59*a*. In embodiments, the back divider panel 57 is at least partially separable from the back panel 21 and the back central panel 55 along respective cut or tear lines 61*a*, 61*b* (e.g., cut lines interrupted by one or more nicks). As shown in FIG. 1, the back central panel 55 is connected to the second side panel 19 by a connector panel 63 (e.g., a second connector panel), which is foldably connected to the second side panel 19 along a lateral fold line 31*b* (which can be collinear with the lateral fold line 31*a*, for example) and is foldably connected to the back central panel 55 along a lateral fold line 59*b* (which can be collinear with the lateral fold line 59*a*, for example). In embodiments, the connector panel 63 can be at least partially separable from the back panel 21 along the cut or tear line 61*b*. In the illustrated embodiments, the carrier blank 3 further can include a back central flap 65 foldably connected to the first side panel 17 along a lateral fold line 67 and at least partially separable from the first side panel 17 along a cut or tear line 69 (e.g., a cut line interrupted by one or more nicks).

Any of the front panel 15, the side panels 17, 19, the back panel 21, the attachment flap 23, the central panels 41, 55, the divider panels 47, 57, the connector panels 53, 63, and/or the central flap 65 could be omitted or could be otherwise shaped, arranged, positioned, and/or configured without departing from the present disclosure.

As shown in FIG. 1, the carrier blank 3 can include handle features for forming the handle 7 when the carrier 5 is formed from the blank 3. The handle features can include a handle opening 71 extending in the front central panel 41 and a handle flap 73 (e.g., a first handle flap) foldably connected to the front central panel 41 along one or more fold lines 75 (e.g., so that the handle flap 73 at least partially extends in the handle opening 71). In embodiments, the handle flap 73 can be separable from the front central panel 41 along a cut or tear line 77 (e.g., a cut line interrupted by one or more nicks). The handle features further can include a handle opening or cutout 79 extending in the back central panel 55 and a handle cutout 81 extending in the back central flap 65. In exemplary embodiments, a handle flap 83 (e.g., a second handle flap) foldably connected to the back central panel 55 along one or more fold lines 85 (e.g., so that the handle flap 83 at least partially extends in the handle opening or cutout 79). In embodiments, the handle flap 83 can be separable from the back central panel 55 along a cut or tear line 87 (e.g., a cut line interrupted by one or more nicks). Any of the handle features could be omitted or could be otherwise shaped, arranged, positioned, and/or configured without departing from the present disclosure.

Figure 5:
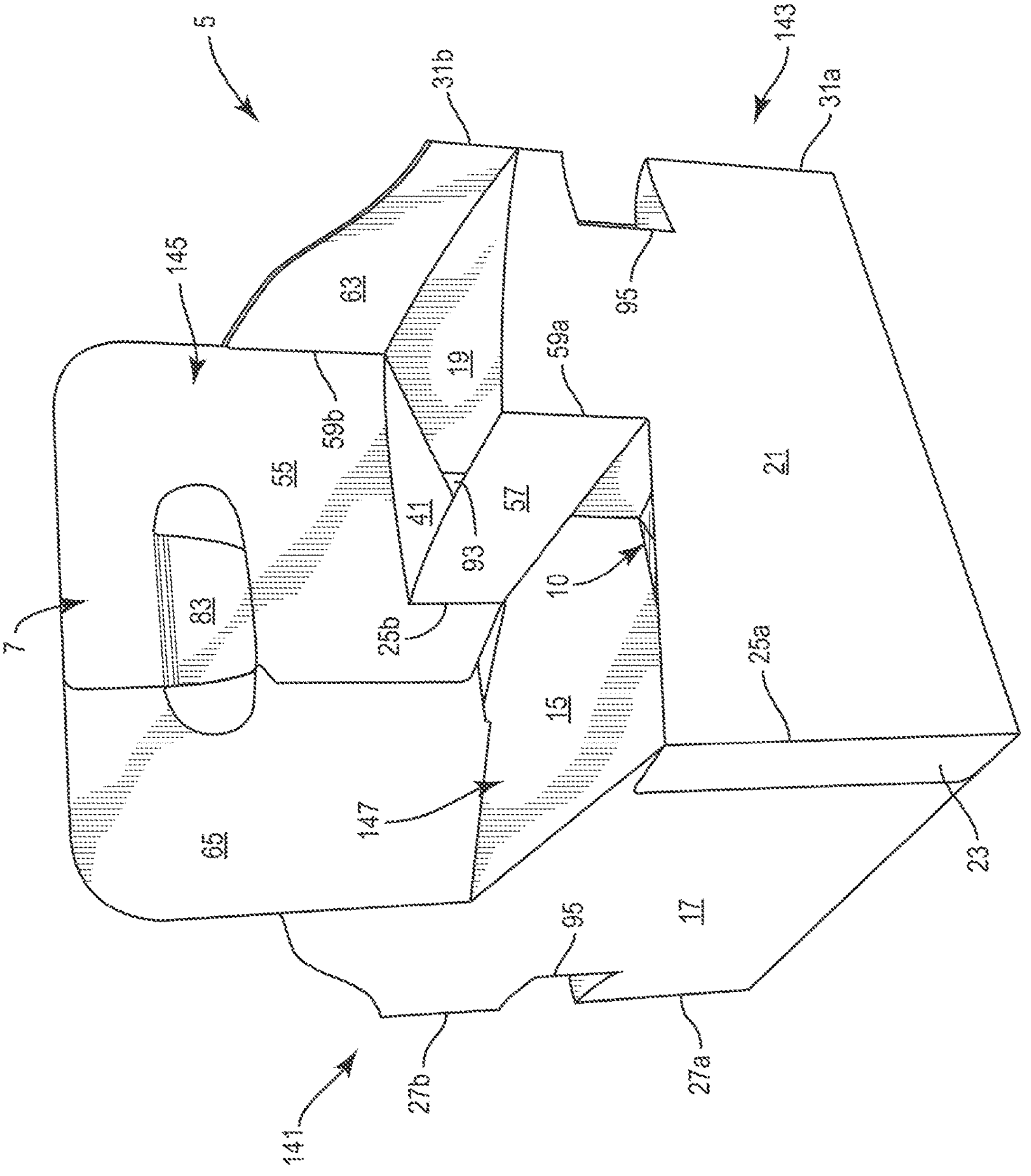
FIGS. 5 and 6 are perspective views of the erected carrier formed from the folded carrier of FIG. 4 according to exemplary embodiments of the disclosure.

In embodiments, the carrier blank 3 can include push-in features 91 that can be pushed in at one or more corners of the carrier 5 (FIG. 5). As shown in FIG. 1, each of the push-in features 91 can include a corner panel 93 foldably connected to the respective panels 15, 17, 19, 21 along respective lateral fold lines 95 and can be separable from the panels along respective cut or tear lines 97. In exemplary embodiments, one of the corner panels 93 is separable from the front central panel 41 and the front divider panel 47 along the cut or tear line 51*a*. In the illustrated embodiments, the corner panels 93 can be foldable along a respective one of the lateral fold lines 27*a*, 29*a*, 31*a*. Any of the push-in features 93 could be omitted or could be otherwise shaped, arranged, positioned, and/or configured without departing from the present disclosure.

As shown in FIG. 1, the carrier blank 3 can include a first or front bottom panel 111*a* foldably connected to the front panel 15, a second or back bottom panel 111*b* foldably connected to the back panel 21, a first bottom flap 113*a* foldably connected to the first side panel 17, and a second bottom flap 113*b* foldably connected to the second side panel 19. In the illustrated embodiments, a (first) bottom attachment flap 115*a* can be foldably connected to the front bottom panel 111*a* along an oblique fold line 117*a* and a (second) bottom attachment flap 115*b* can be foldably connected to the back bottom panel 111*b* along an oblique fold line 117*b*. In embodiments, the front and back bottom panels 111*a*, 111*b* and bottom attachment flaps 115*a*, 115*b* can be similar or identical to one another, and the first and second bottom flaps 113*a*, 113*b* can be similar or identical to one another. As shown in FIG. 1, the bottom panels 111*a*, 111*b* and the bottom flaps 113*a*, 113*b* extend along a bottom marginal area of the blank 3 and are foldably connected along a longitudinal fold line 119 that extends along at least a portion of the length of the blank. The longitudinal fold line 119 may be, for example, substantially straight, or offset at one or more locations to account for blank thickness or for other factors.

Figure 6:
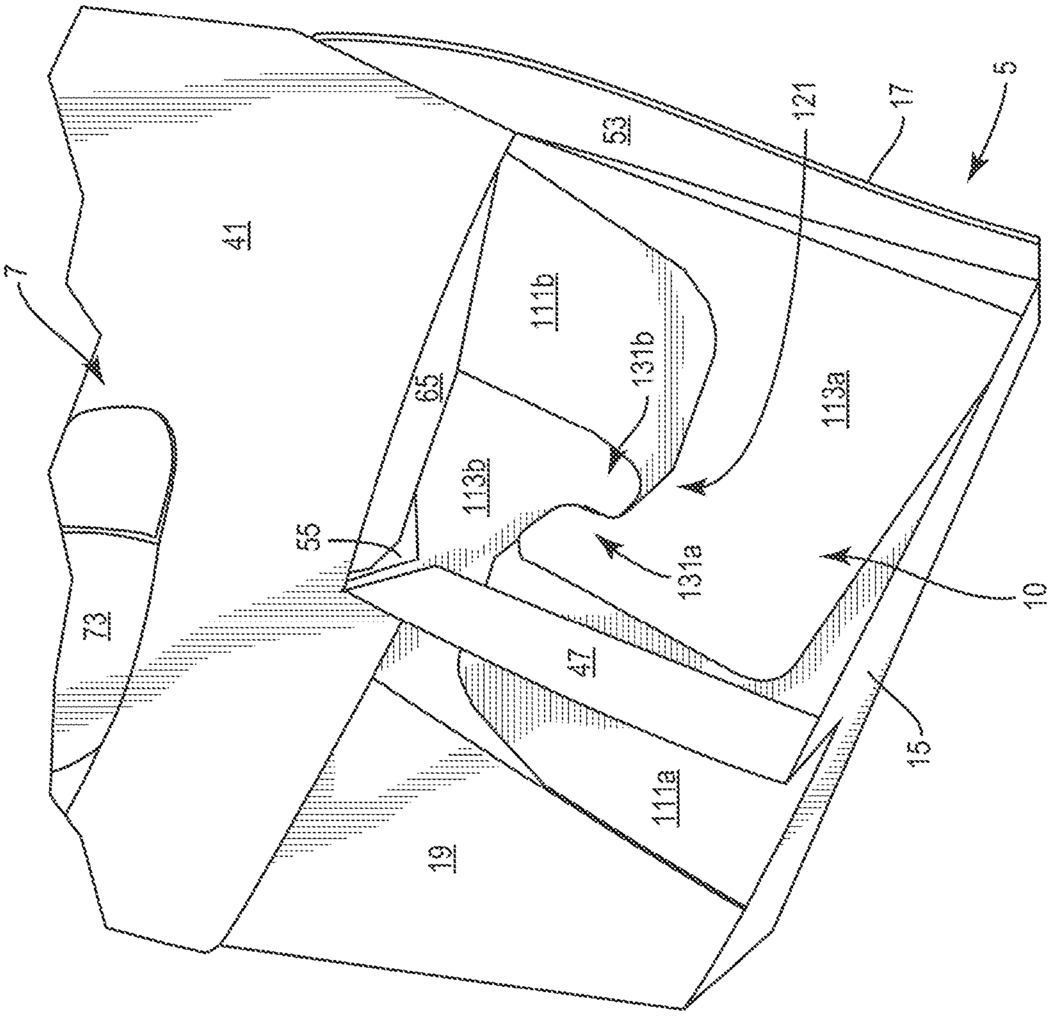
Figure 7:
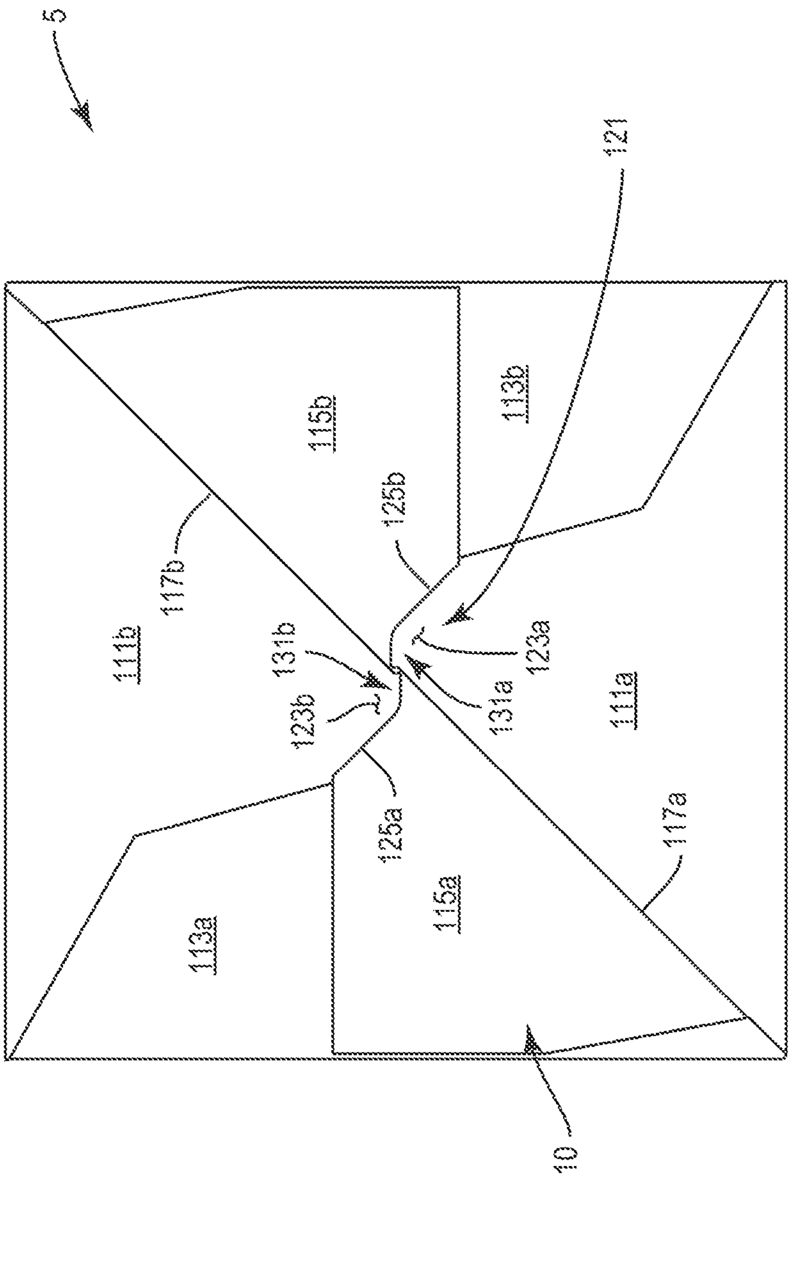
FIG. 7 is a plan view of a bottom wall of the erected carrier of FIGS. 5 and 6.

In the illustrated embodiments, the bottom panels 111*a*, 111*b* and the bottom flaps 113*a*, 113*b* can cooperate to form the bottom wall 10 (FIGS. 6 and 7) and can include locking features for at least partially retaining the bottom panels and bottom flaps in the form of the bottom wall extending across the bottom of the carrier 5 (e.g., at least partially perpendicular to the panels 17, 19, 21) when the carrier is moved from the collapsed configuration 5*a* (FIG. 4) to the erected configuration 5 (FIGS. 5-7). In exemplary embodiments, the locking features of the bottom panels 111*a*, 111*b* are configured for cooperating with the locking features of the respective bottom flaps 113*a*, 113*b* to have double-thickness locking features (e.g., the locking features of the front bottom panel 111*a* and the first bottom flap 113*a* cooperate to form a double-thickness locking feature for being at least partially engaged with a double-thickness locking feature formed by the cooperating locking features of the back bottom panel 111*b* and the second bottom flap 113*b*). In embodiments, the cooperate to form a reinforced locking section 121 (FIGS. 6 and 7) of the bottom wall 10 when the erected carrier 5 is formed, which can help increase the weight capacity of the bottom wall 10, and thus the carrier 5, relative to a bottom wall without double-thickness locking features.

As shown in FIG. 1 the front bottom panel 111*a* and the bottom attachment flap 115*a* can include a notch 123*a* (e.g., a first notch) at least partially defined by an edge 125*a* (e.g., a first edge) extending along at least a portion of the front bottom panel 111*a* and the bottom attachment flap 115*a*. In addition, the first bottom flap 113*a* can include a notch 127*a* (e.g., a second notch) at least partially defined by an edge 129*a* (e.g., a second edge) extending along at least a portion of the first bottom flap 113*a*. Similarly, the back bottom panel 111*b* and the bottom attachment flap 115*b* can include a notch 123*b* (e.g., a third notch) at least partially defined by an edge 125*b* (e.g., a third edge) extending along at least a portion of the back bottom panel 111*b* and the bottom attachment flap 115*b*, and the second bottom flap 113*b* can include a notch 127*b* (e.g., a fourth notch) at least partially defined by an edge 129*b* (e.g., a fourth edge) extending along at least a portion of the first bottom flap 113*b*.

Figure 2:
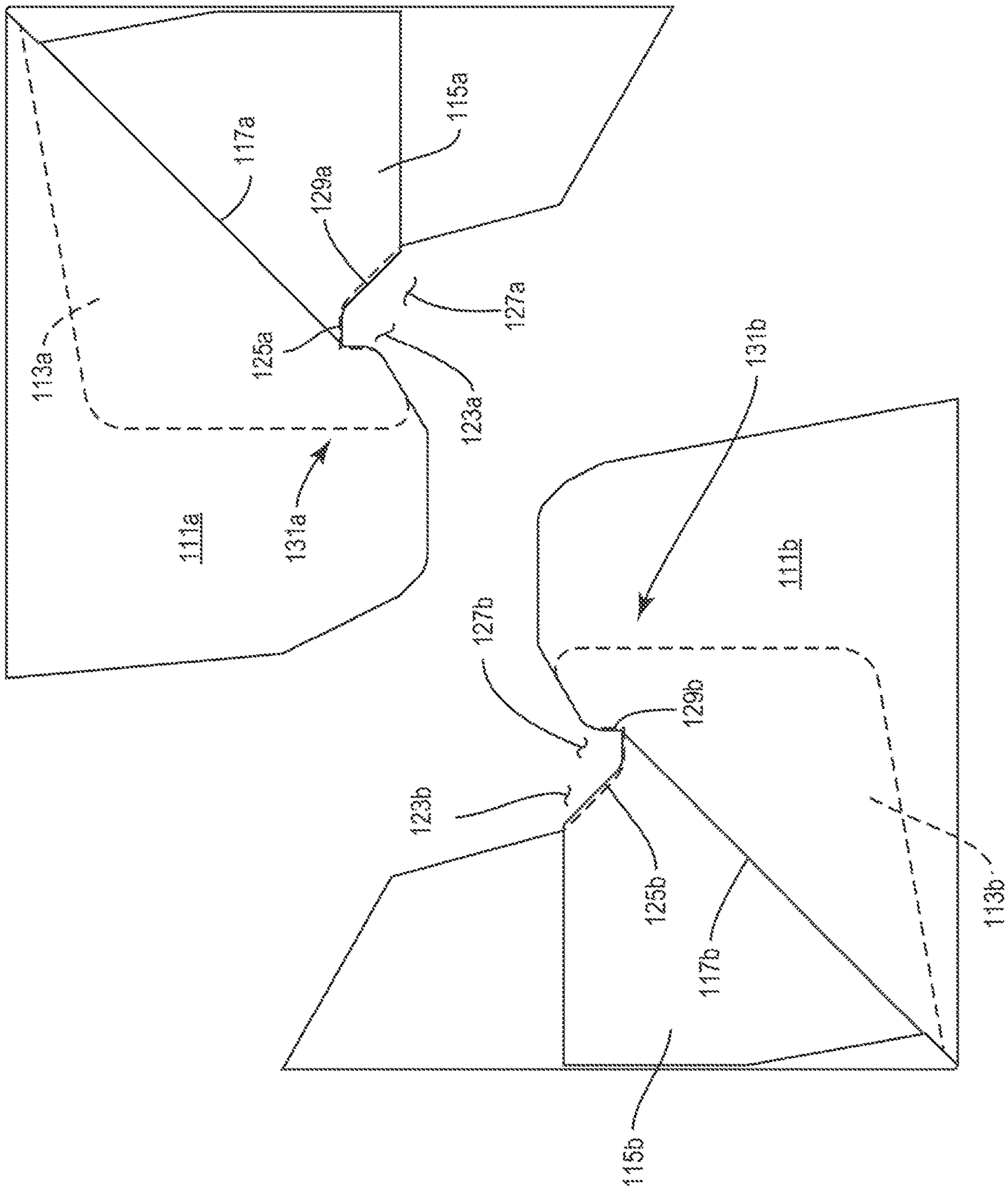
FIG. 2 is a schematic view showing bottom features of the blank of FIG. 1 in a partially overlapping relationship according to exemplary embodiments of the disclosure.

In embodiments, the notches 123*a*, 123*b* are arranged along the bottom panels 111*a*, 111*b* and the notches 127*a*, 127*b* are arranged along the bottom flaps 113*a*, 113*b* so that the edges 125*a*, 125*b* are at least partially aligned with the respective edges 129*a*, 129*b* when the bottom panels 111*a*, 111*b* are in overlapping relationships with the respective bottom flaps 113*a*, 113*b* in the bottom wall 10 in the erected carrier 5. For example, as schematically shown in FIG. 2, which shows the portions of the bottom flaps 113*a*, 113*b* that are hidden behind the bottom panels 111*a*, 111*b* in broken lines, the notches 123*a*, 127*a* and the edges 125*a*, 129*a* of the respective front bottom panel 111*a* and second bottom flap 113*a* are at least partially aligned to form a reinforced lock member 131*a* (broadly: locking member 131*a*) when the front bottom panel 111*a* and the first bottom flap 113*a* are overlapped in the bottom wall 10 of the erected carrier 5. Similarly, as shown in FIG. 2, the notches 123*b*, 127*b* and the edges 125*b*, 129*b* of the respective back bottom panel 111*b* and second bottom flap 113*b* are at least partially aligned to form a reinforced lock member 131*b* (broadly: locking member 131*b*) when the back bottom panel 111*b* and the second bottom flap 113*b* are overlapped in the bottom wall 10.

When the bottom wall 10 is formed in the erected carrier 5, the reinforced lock members 131*a*, 131*b* can cooperate (e.g., interlock, engage, etc.) with one another to at least partially lock and/or secure the bottom wall 10 in its extended configuration (FIGS. 6 and 7). Any of the bottom panels 111*a*, 111*b*, the bottom flaps 113*a*, 113*b*, the bottom attachment flaps 115*a*, 115*b*, the notches 123*a*, 123*b*, 127*a*, 127*b*, the edges 125*a*, 125*b*, 129*a*, 129*b*, and/or the reinforced lock members 131*a*, 131*b* could be omitted or could be otherwise shaped, arranged, positioned, and/or configured without departing from the present disclosure.

Any of the panels, flaps, fold lines, cuts, or other features could be omitted or could be otherwise shaped, arranged, positioned, and/or configured in the blank 3 without departing from the disclosure. The blank 3 could be sized and/or shaped to accommodate more or fewer than four containers without departing from this disclosure.

Figure 3:
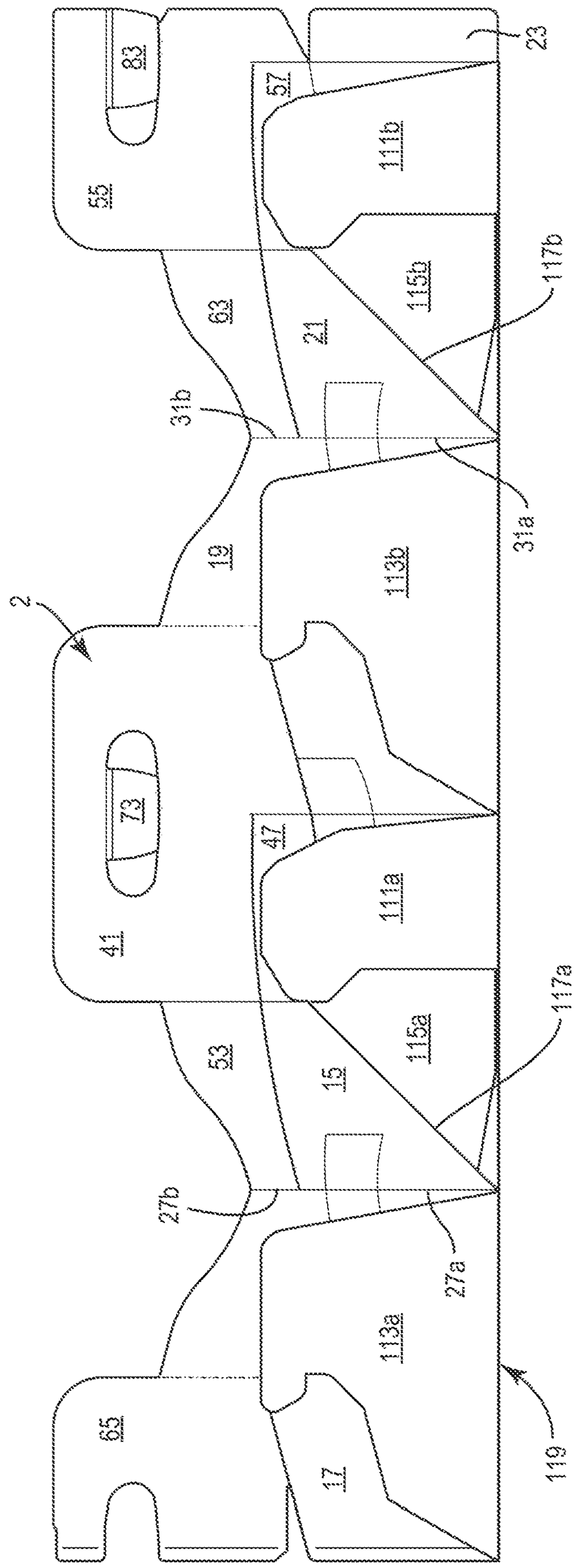
FIG. 3 is a plan view showing the folding of the blank of FIG. 1 to form a construct according to exemplary embodiments of the disclosure.

With reference to FIGS. 3 and 4, in exemplary methods of erection, the carrier 5 can be formed from the blank 3 (e.g., by a packaging system and/or manually) by positioning the panels 15, 17, 19, 21, the central panels 41, 55, the central flap 65, the connecting panels 53, 63, the divider panels 47, 57, and the attachment flap 23 relative to each other to form a front portion 141 and a back portion 143 of the carrier 5 (FIGS. 5-7). The bottom panels 111*a*, 111*b* and the bottom flaps 113*a*, 113*b* further can be folded along the longitudinal fold line 119 and glued to form the bottom wall 10. The carrier can have a collapsed configuration 5*a* (FIG. 4) and an erected configuration 5 (FIGS. 5-7).

In exemplary embodiments, the blank 3 can be positioned with its interior surface 2 facing upwardly, and, as shown in FIG. 3, the bottom panels 111*a*, 111*b* and the bottom flaps 113*a*, 113*b* can be folded along the longitudinal fold line 119 to overlap the interior surface 2 of the respective front and back panels 15, 21 and side panels 17, 19. As shown in FIG. 3, the bottom attachment flaps 115*a*, 115*b* can be folded along the respective oblique fold lines 117*a*, 117*b* so that the exterior surfaces of the bottom attachment flaps 115*a*, 115*b* are in face-to-face contact with the exterior surfaces of the respective bottom panels 111*a*, 111*b*. As shown in hidden lines in FIG. 1, glue G (e.g., glue strips) can be applied to the interior surface 2 of the bottom attachment flaps 115*a*, 115*b*, the attachment flap 23, and the central panels 41, 55. Also, as shown in hidden lines in FIG. 1, glue G can be applied to the connector panels 53, 63 and/or the side panels 17, 19 for attaching the connector panels 53, 63 to the respective side panels 17, 19. The glue strips G are shown in dashed/hidden lines in FIG. 1 since the exterior side 1 of the blank 3 is shown in FIG. 1 and the glue strips G are applied on the interior side 2 of the blank 3. Alternatively or additionally, glue G can be applied to portions of the exterior surface 1 of the blank 3 (e.g., for different overlapping arrangements of the panels/flaps of the blank). In embodiments, one or more of the glue strips G can be applied to the blank 3 at any suitable stage of the forming process.

As shown in FIG. 4, the first side panel 17 can be folded along the lateral fold lines 27*a*, 27*b* so that the first side panel 17 at least partially overlaps the front panel 15, the front divider panel 47, and the connector panel 53 and so that the back central flap 65 overlaps the front central panel 41 (e.g., with the interior surfaces of the panels/flaps in face-to-face contact). The glue strips G on the central panel 41 and the connector panel 53 and/or the first side panel 17 and the back central flap 65 can adhere/secure the connector panel 53 to the first side panel 17 and the front central panel 41 to the back central flap 65. In the illustrated embodiments, the front panel 15 and the front divider panel 47 remain unsecured to the first side panel 17. Also, the first bottom flap 113*a* at least partially overlaps the bottom attachment flap 115*a* and the first bottom panel 111*a* in FIG. 4. The glue strip G on the bottom attachment flap 115*a* (and/or on the first bottom flap 113*a*) can adhere/secure the first bottom flap 113*a* and the bottom attachment flap 115*a* together in face-to-face contact (e.g., with the interior surface of the bottom attachment flap 115*a* in contact with the exterior surface of the first bottom flap 113*a*).

As further shown in FIG. 4, the collapsed carrier 5*a* is formed when the back panel 21 and the connector panel 63 (along with the back central panel 55, the back divider panel 57, and the attachment flap 23) are folded along the lateral fold lines 31*a*, 31*b* so that the back panel 21, the divider panel 57, and the connector panel 63 at least partially overlap the second side panel 19 (e.g., with the interior surfaces of the panels/flaps in face-to-face contact). The glue strips G on the central panel 41 and the connector panel 63 and/or the second side panel 19 and the back central panel 55 can adhere/secure the back central panel 55 to the front central panel 41 and the connector panel 63 to the second side panel 19. In the illustrated embodiments, the back panel 21 and the back divider panel 57 remain unsecured to the second side panel 19. In addition, the back central panel 55 and the attachment flap 23 can at least partially overlap the respective back central flap 65 and first side panel 17 (e.g., with the interior surfaces of the back central panel 55 and the attachment flap 23 in face-to-face contact with the exterior surfaces of the respective back central flap 65 and first side panel 17). The glue strips G on the interior of the back central panel 55 and the attachment flap 23 (and/or on the back central flap 65 and the first side panel 17) can adhere/secure the back central panel 55 to the back central flap 65 and the attachment flap 23 to the first side panel 17. Also, the second bottom flap 113*b* is in an overlapping relationship with the bottom attachment flap 115*b* and the second bottom panel 111*b* as shown in FIG. 4. The glue strip G on the bottom attachment flap 115*b* (and/or on the second bottom flap 113*b*) can adhere/secure the second bottom flap 113*b* and the bottom attachment flap 115*b* together in face-to-face contact (e.g., with the interior surface of the bottom attachment flap 115*b* in contact with the exterior surface of the second bottom flap 113*b*).

In the illustrated embodiments, the central panels 41, 55 and the central flap 65 are secured/adhered together to form a central wall 145 of the carrier 5 with the handle 7 formed in the central wall 145. In embodiments, the handle opening 71 in the front central panel 41 can be at least partially aligned with the handle cutouts 79, 81 in the back central panel 55 and the back central flap 65 to form the handle 7 in the collapsed/flattened carrier 5*a* (and in the erected carrier 5). In addition, as shown in FIGS. 4-6, the handle flap 73 and the handle flap 83 can be at least partially aligned and/or overlapped in face-to-face contact.

As shown in FIG. 5, the collapsed/flattened carrier 5*a* can be further formed into the erected carrier 5 (e.g., by a packaging system and/or manually). For example, the first side panel 17 and second side panel 19 can be positioned to be in a generally spaced-apart, parallel planar relationship, and the front panel 15 and back panel 21 can be positioned to be in a generally spaced-apart, parallel planar relationship with the central wall 145 dividing an interior 147 of the carrier 5 into the front portion 141 and the back portion 143. As the carrier 5 is erected, the back central flap 65 and the front central panel 41 separate from the respective side panels 17, 19 along the respective tear lines 69, 51*a* and the connector panels 53, 63 separate from the respective front panel 15 and back panel 21 along the respective tear lines 51*b*, 61*b*. Such movement of the side panels 17, 19 and front and back panels 15, 21 causes the divider panels 47, 57 to separate from the respective front panel 15 and back panel 21 along respective tear lines 51*a*, 61*a* and from the respective central panels 41, 55 along the respective tear lines 51*b*, 61*b* to be positioned generally perpendicular to the central wall 145 (e.g., to the respective central panels 41, 55) and the respective front panel 15 and back panel 21, thereby dividing the front portion 141 and the back portion 143 each into two receiving spaces (FIGS. 5 and 6).

In the illustrated embodiments, the erecting of the carrier 5 can pull the bottom panels 111*a*, 111*b* and the bottom flaps 113*a*, 113*b* to cause the bottom panels/flaps to come together to form the reinforced lock members 131*a*, 131*b* (FIG. 2) and the bottom wall 10. For example, as the carrier 5 is erected, the bottom attachment flaps 115*a*, 115*b* fold away from the respective bottom panels 111*a*, 111*b*, remaining attached in face-to-face contact with the respective bottom flaps 113*a*, 113*b*, and the bottom panels 111*a*, 111*b* and the bottom flaps 113*a*, 113*b* are pulled until they extend across the bottom of the carrier 5. As the bottom panels/flaps are pulled and the bottom attachment flaps 115*a*, 115*b* fold away from the bottom panels 111*a*, 111*b*, the bottom flaps 113*a*, 113*b* are moved into an overlapping position with respect to the respective bottom panels 111*a*, 111*b* to form the respective reinforced lock members 131*a*, 131*b*. In addition, the edges of the reinforced lock members 131*a*, 131*b* (e.g., the edges 125*a*, 129*a* and 125*b*, 129*b*) can slide along one another as the bottom panels/flaps are pulled across the bottom of the carrier 5 until the notches of the reinforced lock members 131*a*, 131*b* (e.g., the notches 123*a*, 127*a* and 123*b*, 127*b*) become cooperatively engaged and locked together (FIGS. 6 and 7). In embodiments, the engaged reinforced lock members 131*a*, 131*b* can support articles in the carrier 5 and prevent them from falling through the bottom of the carrier at least because downward forces on the bottom wall 10 (e.g., due to the weight of articles placed in the carrier 5) push the notches of the reinforced lock members 131*a*, 131*b* together, and the edges extending along the notches will be pressed together and resist relative movement between the reinforced lock members 131*a*, 131*b* so that the bottom panels/flaps do not fold downwardly.

In exemplary embodiments, articles including containers such as take-away drink cups, coffee cups, bottles, cans, jars, French fry containers, etc., and/or other suitable articles, such as food items, condiments, cutlery, napkins, etc. can be placed into the receiving spaces of the carrier 5 to form the package. For example, the carrier 5 could be used to hold articles for take-away, e.g., holding drink containers in two of the receiving spaces and food items in the other two receiving spaces with the articles (e.g., the drink containers and the food items) being supported on the reinforced bottom wall 10. In another example, a container can be held in each of the receiving spaces in a retail situation. The bottoms of the containers are supported by the reinforced bottom wall 10. In embodiments, the carrier 5 could be flatted/collapsed such as by reversing the above steps. The carrier 5 could be otherwise erected and/or collapsed without departing from the disclosure.

The exemplary carrier embodiment discussed above accommodates four containers arranged in two rows, but the present disclosure is not limited to these numbers. As one example, additional containers may be accommodated by increasing the size of the blank 3 and forming additional container-receiving spaces therein. Also, the carrier 5 could have fewer than four container-receiving spaces.

Any of the features of the various embodiments of the disclosure can be combined with, replaced by, or otherwise configured with other features of other embodiments of the disclosure without departing from the scope of this disclosure. In addition, the panels, flaps, and other features shown and described in conjunction with the blank 3 and the carrier 5 are included by way of example.

In general, the blank may be constructed from paperboard having a caliper so that it is heavier and more rigid than ordinary paper. The blank can also be constructed of other materials, such as cardboard, or any other material having properties suitable for enabling the carrier or carton to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding thereal-ong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the carrier embodiments. The term "glue" is intended to encompass all manner of adhesives commonly used to secure carrier panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carrier for holding one or more articles, the carrier comprising:
- a plurality of panels extending at least partially around an interior of the carrier;
- a bottom wall extending along the interior of the carrier, the bottom wall comprising a first locking member engaged with a second locking member, wherein a first bottom panel and a first bottom flap overlap in a face-to-face arrangement to form the first locking member, and wherein a second bottom panel and a second bottom flap overlap in a face-to-face arrangement to form the second locking member; and
- a central wall foldably connected to one or more panels of the plurality of panels.

2. The carrier of claim 1, wherein the first locking member and the second locking member engage one another at respective notches to resist downward forces on the bottom wall.

3. The carrier of claim 2, wherein the first bottom panel and the first bottom flap are overlapped along the notch of the first locking member and the second bottom panel and the second bottom flap are overlapped along the notch of the second locking member.

4. The carrier of claim 1, wherein the first bottom panel comprises a first edge at least partially defining a first notch, the first bottom flap comprises a second edge at least partially defining a second notch, and the first bottom panel and the first bottom flap are at least partially overlapped so that the first notch and the second notch are at least partially aligned in the bottom wall.

5. The carrier of claim 4, wherein the second bottom panel comprises a third edge at least partially defining a third notch, the second bottom flap comprises a fourth edge at least partially defining a fourth notch, and the second bottom panel and the second bottom flap are at least partially overlapped so that the third notch and the fourth notch are at least partially aligned in the bottom wall.

6. The carrier of claim 5, wherein at least one of the first edge of the first bottom panel and the second edge of the first bottom flap contacts at least one of the third edge of the second bottom panel and the fourth edge of the second bottom flap.

7. The carrier of claim 5, wherein the bottom wall further comprises a first attachment flap foldably connected to the first bottom panel and a second attachment flap foldably connected to the second bottom panel, the first notch extends along at least a portion of the first bottom panel and the first attachment flap, and the second notch extends along at least a portion of the second bottom panel and the second attachment flap.

8. The carrier of claim 1, wherein the bottom wall further comprises a first attachment flap foldably connected to the first bottom panel and a second attachment flap foldably connected to the second bottom panel, and the first attachment flap is attached in face-to-face contact with the first bottom flap and the second attachment flap is attached in face-to-face contact with the second bottom flap.

9. The carrier of claim 1, wherein the plurality of panels comprises at least a front panel and a side panel, the front panel being foldably connected to the side panel, and wherein the central wall comprises at least a central panel foldably connected to the side panel.

10. The carrier of claim 9, further comprising a divider panel foldably connected to the central panel and the front panel, the divider panel extending from the central wall to the front panel.

11. The carrier of claim 9, wherein the side panel is a second side panel, the plurality of panels comprises a first side panel foldably connected to the front panel, a connector panel is foldably connected to the central panel and the first side panel, and the connector panel and the first side panel are at least partially overlapped.

12. The carrier of claim 9, wherein the plurality of panels further comprises a back panel foldably connected to the side panel.

13. The carrier of claim 12, wherein the central panel is a first central panel, the central wall further comprises a second central panel in overlapping relationship with the first central panel, a first divider panel is foldably connected to the first central panel and the front panel, and a second divider panel is foldably connected to the second central panel and the back panel.

14. The carrier of claim 12, wherein the central panel is a first central panel, the central wall further comprises a second central panel in overlapping relationship with the first central panel, and a connector panel is foldably connected to the second central panel and the side panel, the connector panel being in overlapping relationship with the side panel.

15. The carrier of claim 14, wherein the side panel is a second side panel, the connector panel is a second connector panel, the plurality of panels further comprises a first side panel foldably connected to at least the front panel, and a first connector panel is foldably connected to the first central panel and the first side panel, the first connector panel being in overlapping relationship with the first side panel.

16. A blank for forming a carrier for holding a plurality of articles, the blank comprising:

- a plurality of panels for extending at least partially around an interior of the carrier formed from the blank;
- a first bottom panel, a first bottom flap, a second bottom panel, and a second bottom flap foldably connected to respective panels of the plurality of panels, wherein the first bottom panel and the first bottom flap overlap in a face-to-face arrangement to form a first locking member when the carrier is formed from the blank, and the second bottom panel and the second bottom flap overlap in a face-to-face arrangement to form a second locking member when the carrier is formed from the blank, and the first locking member and the second locking member are for engaging one another to form a bottom wall of the carrier formed from the blank; and
- a central panel foldably connected to one or more panels of the plurality of panels, the central panel being for at least partially forming a central wall of the carrier formed from the blank.

17. The blank of claim 16, wherein the first bottom panel comprises a first edge at least partially defining a first notch, the first bottom flap comprises a second edge at least partially defining a second notch, and the first bottom panel and the first bottom flap are for being at least partially overlapped so that the first notch and the second notch are at least partially aligned in the bottom wall when the carrier is formed from the blank.

18. The blank of claim 17, wherein the second bottom panel comprises a third edge at least partially defining a third notch, the second bottom flap comprises a fourth edge at least partially defining a fourth notch, and the second bottom panel and the second bottom flap are for being at least partially overlapped so that the third notch and the fourth notch are at least partially aligned in the bottom wall when the carrier is formed from the blank.

19. The blank of claim 18, wherein at least one of the first edge of the first bottom panel and the second edge of the first bottom flap are for contacting at least one of the third edge of the second bottom panel and the fourth edge of the second bottom flap when the carrier is formed from the blank.

20. The blank of claim 18, wherein the blank further comprises a first attachment flap foldably connected to the first bottom panel and a second attachment flap foldably connected to the second bottom panel, the first notch extends along at least a portion of the first bottom panel and the first attachment flap, and the second notch extends along at least a portion of the second bottom panel and the second attachment flap.

21. The blank of claim 16, wherein the blank further comprises a first attachment flap foldably connected to the first bottom panel and a second attachment flap foldably connected to the second bottom panel, and the first attachment flap is for being attached in face-to-face contact with the first bottom flap when the carrier is formed from the blank and the second attachment flap is for being attached in face-to-face contact with the second bottom flap when the carrier is formed from the blank.

22. The blank of claim 16, wherein the plurality of panels comprises at least a front panel and a side panel, the front panel being foldably connected to the side panel and the central panel being foldably connected to the side panel.

23. The blank of claim 22, further comprising a divider panel foldably connected to the central panel and the front panel, the divider panel being separable from the central panel and the front panel along respective cut or tear lines.

24. The blank of claim 22, wherein the side panel is a second side panel, the plurality of panels comprises a first side panel foldably connected to the front panel, a connector panel is foldably connected to the central panel and the first side panel, and the connector panel is at least partially separable from the front panel along a cut or tear line.

25. The blank of claim 22, wherein the plurality of panels further comprises a back panel foldably connected to the side panel.

26. The blank of claim 25, wherein the central panel is a first central panel, the blank further comprises a second central panel for being in overlapping relationship with the first central panel for at least partially forming the central wall of the carrier formed from the blank, a first divider panel is foldably connected to the first central panel and the front panel, and a second divider panel is foldably connected to the second central panel and the back panel.

27. The blank of claim 25, wherein the central panel is a first central panel, the blank further comprises a second central panel for being in overlapping relationship with the first central panel for at least partially forming the central wall of the carrier formed from the blank, and wherein a connector panel is foldably connected to the second central panel and the side panel, the connector panel being at least partially separable from the back panel along a cut or tear line.

28. The blank of claim 27, wherein the side panel is a second side panel, the connector panel is a second connector panel, the plurality of panels further comprises a first side panel foldably connected to at least the front panel, and a first connector panel is foldably connected to the first central panel and the first side panel, the first connector panel being at least partially separable from the front panel along a cut or tear line.

29. A method of forming a carrier for holding a plurality of articles, the method comprising:

obtaining a blank comprising a plurality of panels, a central panel foldably connected to one or more panels of the plurality of panels, and a first bottom panel, a first bottom flap, a second bottom panel, and a second bottom flap foldably connected to respective panels of the plurality of panels;

folding the plurality of panels to at least partially form a collapsed carrier; and forming the carrier by folding the collapsed carrier to move the plurality of panels to extend at least partially around an interior of the carrier, the folding the collapsed carrier causing the first bottom panel and the first bottom flap to overlap in a face-to-face arrangement to form a first locking member, causing the second bottom panel and the second bottom flap to overlap in a face-to-face arrangement to form a second locking member, and causing the first locking member and the second locking member to engage one another to form a bottom wall of the carrier.

30. The method of claim 29, wherein the folding the collapsed carrier causes the first locking member and the second locking member to engage one another at respective notches to resist downward forces on the bottom wall.

31. The method of claim 29, wherein the first bottom panel comprises a first edge at least partially defining a first notch, the first bottom flap comprises a second edge at least partially defining a second notch, and the causing the first bottom panel and the first bottom flap to be at least partially overlapped comprises at least partially aligning the first notch and the second notch in the bottom wall.

32. The method of claim 31, wherein the second bottom panel comprises a third edge at least partially defining a third notch, the second bottom flap comprises a fourth edge at least partially defining a fourth notch, and the causing the second bottom panel and the second bottom flap to be at least partially overlapped comprises at least partially aligning the third notch and the fourth notch in the bottom wall.

33. The method of claim 29, wherein:

the blank further comprises a first attachment flap foldably connected to the first bottom panel and a second attachment flap foldably connected to the second bottom panel;

the method further comprises folding the first bottom panel, the first bottom flap, the second bottom panel, and the second bottom flap over the respective panels of the plurality of panels, and folding the first attachment flap and the second attachment flap over the respective first bottom panel and second bottom panel; and the folding the plurality of panels to at least partially form the collapsed carrier comprises at least partially overlapping the first bottom flap and the first attachment flap and at least partially overlapping the second bottom flap and the second attachment flap.

34. The method of claim 33, wherein the at least partially overlapping the first bottom flap and the first attachment flap comprises attaching the first bottom flap and the first attachment flap in face-to-face contact, and the at least partially overlapping the second bottom flap and the second attachment flap comprises attaching the second bottom flap and the second attachment flap in face-to-face contact.

35. The method of 29, wherein the plurality of panels comprises at least a front panel and a side panel, the front panel being foldably connected to the side panel and the central panel being foldably connected to the side panel, wherein the blank further comprises a divider panel foldably connected to the central panel and the front panel, and wherein the folding the collapsed carrier further causes the divider panel to separate from the front panel and the central panel along respective cut or tear lines and to extend from the central panel to the front panel along the interior of the carrier.

36. The method of claim 35, wherein the side panel is a second side panel and the plurality of panels comprises a first side panel foldably connected to the front panel, wherein the blank further comprises a connector panel is foldably connected to the central panel and the first side panel, and wherein the folding the collapsed carrier further causes the connector panel to separate from the front panel along a cut or tear line.

37. The method of claim 29, wherein the central panel is a first central panel and the blank further comprises a second central panel, and wherein the method further comprises at least partially forming a central wall during the folding the plurality of panels to at least partially form the collapsed carrier by at least partially overlapping the first central panel and the second central panel.

38. A carrier for holding one or more articles, the carrier comprising:

a plurality of panels comprising at least a front panel, a side panel, and a central panel, wherein the central panel extends from the side panel to at least partially divide the carrier into a front portion and a back portion, each of the central panel and the front panel is foldably connected to the side panel; and a bottom wall comprising at least a bottom panel foldably connected to the front panel and a bottom flap foldably connected to the side panel, the bottom wall comprising a first locking feature extending in the bottom panel and a second locking feature extending in the bottom flap, wherein the bottom panel and the bottom flap are in an at least partially overlapping relationship so that the first locking feature and the second locking feature are engaged.

39. The carrier of claim 38, further comprising a divider panel foldably connected to the central panel and the front panel, the divider panel extending from the central wall to the front panel.

40. The carrier of claim 39, wherein the side panel is a second side panel, the plurality of panels comprises a first side panel foldably connected to the front panel, a connector panel is foldably connected to the central panel and the first side panel, and the connector panel and the first side panel are at least partially overlapped.

41. The carrier of claim 38, wherein the side panel is a second side panel, the plurality of panels comprises a first side panel foldably connected to the front panel, a connector panel is foldably connected to the central panel and the first side panel, and the connector panel and the first side panel are at least partially overlapped.

42. The carrier of claim 38, wherein the plurality of panels further comprises a back panel foldably connected to the side panel, the central panel is a first central panel, a second central panel is in overlapping relationship with the first central panel, a first divider panel is foldably connected to the first central panel and the front panel, and a second divider panel is foldably connected to the second central panel and the back panel.

43. The carrier of claim 38, wherein the plurality of panels further comprises a back panel foldably connected to the side panel, the central panel is a first central panel, a second central panel is in overlapping relationship with the first central panel, and a connector panel is foldably connected to the second central panel and the side panel, the connector panel being in overlapping relationship with the side panel.

* * * * *